United States Patent
Endou et al.

(10) Patent No.: US 10,272,668 B2
(45) Date of Patent: Apr. 30, 2019

(54) CONVEYANCE DEVICE

(71) Applicant: TOYO SEIKAN CO., LTD., Tokyo (JP)

(72) Inventors: Tadashi Endou, Yokohama (JP); Osamu Hatano, Yokohama (JP); Nobuhiro Sasajima, Yokohama (JP)

(73) Assignee: TOYO SEIKAN CO., LTD., Tokyo (JP)

(*) Notice: Subject to any disclaimer, the term of this patent is extended or adjusted under 35 U.S.C. 154(b) by 0 days.

(21) Appl. No.: 15/471,389

(22) Filed: Mar. 28, 2017

(65) Prior Publication Data

US 2017/0197401 A1    Jul. 13, 2017

Related U.S. Application Data

(63) Continuation of application No. PCT/JP2015/075531, filed on Sep. 9, 2015.

(30) Foreign Application Priority Data

Sep. 30, 2014 (JP) .................................. 2014-200062
May 1, 2015 (JP) .................................. 2015-94279
May 1, 2015 (JP) .................................. 2015-94280

(51) Int. Cl.
*B65G 47/84* (2006.01)
*B65G 47/74* (2006.01)
(Continued)

(52) U.S. Cl.
CPC ............ *B41F 17/18* (2013.01); *B41F 17/002* (2013.01); *B41F 17/22* (2013.01); *B65G 47/32* (2013.01);
(Continued)

(58) Field of Classification Search
None
See application file for complete search history.

(56) References Cited

U.S. PATENT DOCUMENTS 3,572,493 A    3/1971  Babunovic
4,511,027 A    4/1985  Zamboni
(Continued)

FOREIGN PATENT DOCUMENTS

DE    3007104 A1   9/1981
GB    2107666 A    5/1983
(Continued)

OTHER PUBLICATIONS

International Search Report dated Dec. 15, 2015, issued in counterpart International Application No. PCT/JP2015/075531 (2 pages).

*Primary Examiner* — Kavel Singh
(74) *Attorney, Agent, or Firm* — Westerman, Hattori, Daniels & Adrian, LLP

(57) ABSTRACT

Provided is a conveyance device capable of reducing the speed of conveyed objects, with the interval therebetween being narrowed substantially, while arranging the conveyed objects, which have been carried in one row, in a plurality of rows. The present invention includes a conveyance turret (110) that holds and conveys conveyed objects (K) and a carrying-out turret (120) that holds the conveyed objects (K) and transfers the same to a carrying-out conveyor (130), wherein the carrying-out conveyor (130) is configured to hold the conveyed objects (K) in a plurality of rows and carry out the same, the carrying-out turret (120) is provided in plurality so as to correspond to the plurality of rows of the carrying-out conveyor (130), and the conveyance turret (110) and the carrying-out turret (120) have an interval adjustment mechanism that changes radial positions of the held conveyed objects (K) according to rotation angles thereof.

9 Claims, 14 Drawing Sheets

(51) Int. Cl.
  *B41F 17/18* (2006.01)
  *B41F 17/22* (2006.01)
  *B65G 47/32* (2006.01)
  *B41F 17/00* (2006.01)
  *B65G 47/71* (2006.01)

(52) U.S. Cl.
  CPC ........... *B65G 47/71* (2013.01); *B65G 47/848* (2013.01); *B65G 2201/0252* (2013.01)

(56) References Cited

U.S. PATENT DOCUMENTS

| | | | |
|---|---|---|---|
| 5,231,926 A | | 8/1993 | Williams et al. |
| 5,457,936 A | * | 10/1995 | Neel ..................... B67B 3/2033 53/317 |
| 5,749,631 A | | 5/1998 | Williams |
| 6,112,880 A | | 9/2000 | Flix |
| 6,467,609 B1 | | 10/2002 | Williams et al. |
| 6,523,670 B1 | | 2/2003 | Simkowski |
| 7,114,535 B2 | * | 10/2006 | Hartness ................... B67C 3/02 141/145 |
| 8,297,431 B2 | * | 10/2012 | Lanfranchi ........ B65G 47/1457 198/377.01 |
| 2007/0240302 A1 | | 10/2007 | Schabert et al. |
| 2014/0069283 A1 | | 3/2014 | Haas et al. |

FOREIGN PATENT DOCUMENTS

| | | |
|---|---|---|
| JP | 62-11862 Y2 | 3/1987 |
| JP | 5-16174 U | 3/1993 |
| JP | 2000-509004 A | 7/2000 |
| JP | 3228295 B2 | 9/2001 |
| JP | 2003-519058 A | 6/2003 |
| JP | 2012-157935 A | 8/2012 |
| JP | 2014-515923 A | 7/2014 |
| JP | 2014-240040 A | 12/2014 |
| WO | 93/06998 A1 | 4/1993 |
| WO | 97/41050 A1 | 11/1997 |
| WO | 00/68121 A1 | 11/2000 |
| WO | 2010/032735 A1 | 3/2010 |

* cited by examiner

CONVEYANCE DEVICE

TECHNICAL FIELD

The present invention relates to a conveyance device having a conveyance turret that holds and conveys conveyed objects that are continuously supplied, a carrying-out turret that holds the conveyed objects and transfers the same to a carrying-out conveyor, and the carrying-out conveyor that holds the conveyed objects and continuously carries out the same.

BACKGROUND ART

Conventionally, there have been known conveyance devices that carry out conveyed objects continuously supplied at a prescribed interval from a prior process to a subsequent process while changing the interval and a speed.

For example, when the outer peripheral surfaces of cylindrical cans in which a beverage or the like is to be filled are printed and coated, the outer peripheral surfaces of the cans are printed by ink in a printing process and then the ink and varnish are cured and fixed in a baking process.

The printing process allows the printing of the outer peripheral surfaces while conveying the cans at a high speed and at a prescribed interval, but the baking process requires a certain time. Therefore, in order to prevent the enlargement of a device, it is desirable to perform the printing process and the baking process while conveying the cans at a narrower interval and a lower speed.

In response to such a request, there have been known conveyance devices that have a turret that holds and conveys continuously supplied conveyed objects and a carrying-out conveyor that holds the conveyed objects and continuously carries out the same, and conveys the cans carried in the turret in a prior process to a subsequent process by the carrying-out conveyor while changing the conveyance speed of the cans and the interval between the cans during their conveyance (see, for example, PTL 1, 2, or the like).

In conveyance devices known in PTL 1 and 2, conveyance turrets (a transport wheel 27 and a transfer wheel 27) to which cans are continuously transferred from the carrying-out mechanism in a prior process (a printing process) have an interval adjustment mechanism that changes the radial positions of the held cans according to its rotation angle.

The conveyance turrets (the transport wheel 27 and the transfer wheel 27) reduces the radial positions of the respective cans during their rotations, and transfer the cans to a subsequent stage in two rows while alternately arranging the same at different radial positions.

In the conveyance device known in PTL 1, the subsequent stage represents a carrying-out conveyor (a deco chain) that holds the cans with pins 29 and carries out the same to a subsequent process, and the conveyance device is configured to transfer the cans from the conveyance turrets (the transport wheel 27 and the transfer wheel 27) to the carrying-out conveyor (the deco chain) in two rows and carry out the same to the subsequent process.

In the conveyance device known in PTL 2, a carrying-out turret (a conveyor plate 102) that sucks and holds the cans on its front surface is provided at the next stage of the conveyance turret (the transfer wheel 27), and the cans are transferred from the transfer turret (the transfer wheel 27) to the carrying-out turret (the conveyor turret 102) in two rows.

The carrying-out turret (the conveyor plate 102) is configured to convey the cans while holding the same in the two rows and transfer the cans to a carrying-out conveyor (a conveyor belt 105) remaining in the two rows, and the carrying-out conveyor (the conveyor belt 105) is configured to suck and hold the cans on its front surface and carry out the same to a subsequent process.

CITATION LIST

Patent Literature

[PTL 1] Japanese Patent No. 3228295
[PTL 2] Japanese Translation of PCT Application No. 2000-509004

SUMMARY OF INVENTION

Technical Problem

In such known conveyance devices, the conveyance turrets (the transport wheel 27 and the transfer wheel 27) have the interval adjustment mechanism that changes the radial positions of the held cans according to their rotation angles, and a change in the interval between the cans and the speed of the cans and the arrangement of the cans in the two rows are simultaneously performed only by the conveyance turrets, which results in the complicated structure or the operation of the internal adjustment mechanism and a difficulty in reducing the speed while substantially narrowing the interval.

Actually, in embodiments described in the above known PTL 1 and PTL 2, the interval between the cans in each of the two rows is made greater than that of the cans in one row at a time at which the cans are conveyed in, whereby the influence of such problems is alleviated.

In addition, in the conveyance device known in PTL 1, the carrying-out conveyor holds the cans by the pins. Therefore, if the speed of the cans does not substantially reduce when the cans are transferred from the conveyance turrets to the carrying-out conveyor, a great force or an impact may be applied to some of the bodies of the cans to cause deformation in the cans, which becomes a factor that hinders an increase in the entire speed of the conveyance device.

In the conveyance device known in PTL 2, the cans arranged in the two rows by the conveyance turrets have different tangential velocities due to their different radial positions, and the respective rows of the transfer wheel to which the cans are transferred also have different tangential velocities. Therefore, it is not possible to make the speeds of the cans of both the two rows coincide with each other at a transfer position.

In addition, the movement directions of the cans coincide with each other only at one point on a line connecting the centers of both the conveyance turrets to each other, but are necessarily made different before and after the point.

Therefore, even in a row in which the speeds of the cans at the transfer position are made to coincide with each other, the positional deviation of the cans occurs at a moment at which the cans are transferred and thus the interval between the cans cannot be made accurate. In addition, in the case of thin cans, deformation may be caused in the ends of the holding surfaces of the cans by the influence of the deviation, which also becomes a factor that hinders an increase in the speed of the conveyance device.

The problem is also found when the cans are transferred from the transfer wheel to the carrying-out conveyor.

The present invention has been made in order to solve the above problems and has an object of providing a conveyance device capable of reducing the speed of conveyed objects with the interval therebetween narrowed substantially while arranging the conveyed objects having been carried in one row in a plurality of rows, capable of simplifying its structure or operation, and capable of improving accuracy in the interval between the conveyed objects while preventing the deformation of the conveyed objects during transfer.

Solution to Problem

In order to solve the above problems, the present invention provides a conveyance device having: a conveyance turret that holds and conveys conveyed objects that are continuously supplied; a carrying-out turret that holds the conveyed objects and transfers the same to a carrying-out conveyor; and the carrying-out conveyor that holds the conveyed objects and continuously carries out the same, wherein the carrying-out conveyor is configured to hold the conveyed objects in a plurality of rows and carryout the same, the carrying-out turret is provided in plurality so as to correspond to the plurality of rows of the carrying-out conveyor, and the conveyance turret and the carrying-out turret have an interval adjustment mechanism that changes radial positions of the held conveyed objects, according to rotation angles thereof.

Advantageous Effects of Invention

A conveyance device according to claim 1 has a conveyance turret that receives supplied conveyed objects and a carrying-out turret that transfers the conveyed objects to a carrying-out conveyor, and the carrying-out turret is provided in plurality so as to correspond to a plurality of rows of the carrying-out conveyor. Thus, the conveyed objects in one row transferred from the conveyance turret at a prior stage can be transferred and arranged in a plurality of rows.

Further, the conveyance turret and the carrying-out turret have an interval adjustment mechanism that changes radial positions of the held conveyed objects according to rotation angles thereof. Thus, the interval adjustment mechanisms can successively reduce the interval between the conveyed objects and the speed of the conveyed objects in a state in which the conveyed objects remain in one row. Therefore, it becomes possible to reduce the speed of the conveyed objects with the interval therebetween narrowed substantially, and the structure or the operation of the conveyance device can be simplified.

In addition, the conveyed objects are separately transferred in all the rows between the conveyance turret and the carrying-out turret or between the carrying-out turret and the carrying-out conveyor. Therefore, it becomes possible to reliably transfer the conveyed objects at the same speed and at the same positions, and accuracy in the interval between the conveyed objects can be improved while the deformation of the conveyed objects is prevented during transfer.

According to a configuration described in claim 2, the conveyance turret and the carrying-out turret have a plurality of holding units that individually holds the conveyed objects, and the interval adjustment mechanism has cam members fixedly provided in parallel with the conveyance turret and the carrying-out turret and cam follower members provided at the holding units so as to engage the cam members. Therefore, the radial positions of the held conveyed objects can be changed according to the rotation angles only by rotating the conveyance turret and the carrying-out turret, and thus the conveyance device can have a simplified configuration.

In addition, the conveyed objects can be moved on any track by appropriately designing the shape of the cam members. Therefore, the flexibility of a design is improved.

According to a configuration described in claim 3, the holding units each have a gas circulation hole at a holding surface thereof for holding the conveyed objects, and the holding units are configured to individually hold the conveyed objects by negative pressure and release the conveyed objects by positive pressure. Therefore, when the conveyance turret and the carrying-out turret, or the carrying-out turret and the carrying-out conveyor, to which the conveyed objects are to be transferred, face each other at an interval slightly greater than the conveyed objects, the conveyed objects can be instantaneously transferred at transfer positions under a small impact. Therefore, accuracy in the interval between the conveyed objects can be further improved, while the deformation of the conveyed objects is reliably prevented during the transfer.

According to a configuration described in claim 4, the holding units draw a linear movement track before and after a transfer position at which the conveyed objects are transferred. Thus, the movement direction does not change before and after the transfer position.

In addition, when each of the holding units is set to draw the linear movement track at the same radial position, the movement speeds and the movement directions are made to continuously coincide with each other before and after the position at which the conveyed objects are to be transferred.

Thus, the positional deviation of the workpieces can be prevented even when a transfer timing slightly changes, and accuracy in the interval between the conveyed objects can be further improved while the deformation of the conveyed objects is reliably prevented during the transfer.

According to a configuration described in claim 5, the carrying-out conveyor is configured to be capable of discharging the conveyed objects of the adjacent rows from terminal ends thereof, with the adjacent rows being deviated from each other by half a pitch. Thus, the interval between the conveyed objects of the adjacent rows can be minimized.

As a result, it becomes possible to improve space efficiency with reduction in the interval between the adjacent rows and prevent the conveyed objects from contacting each other or interfering with each other even when the positions of the conveyed objects are deviated or moved during the conveyance or in a subsequent process.

According to a configuration described in claim 6, the carrying-out conveyor has conveyance path lengths different from each other independently for the plurality of rows. Thus, regardless of the arrangement relationship between the conveyed objects, it becomes possible to design the carrying-out conveyor such that the conveyed objects reliably reach in a state of deviating from each other by half a pitch.

According to a configuration described in claim 7, a contact member movable with respect to a negative pressure introduction member, an urging member that urges the contact member in a holding surface direction with respect to the negative pressure introduction member, and a guide member that restricts a movement range in a sucking direction of the contact member are provided. Thus, when an object is adsorbed and transferred between a first holding mechanism and a second holding mechanism, the contact member moves against a pressing force by the urging member after the object first comes in contact with the contact member and the object is adsorbed and held in a state in which the contact member is restricted and stopped by the guide member. Therefore, an impact caused when the object is adsorbed is lessened by the movement of the contact member pressed by the urging member, and the deformation or the damage of the object can be prevented.

In addition, an adsorption holding position is determined at a time at which the object comes in contact with the contact member. Therefore, the deviation of a holding position can be reduced.

Further, it becomes possible to prevent the deformation of the object and attain an increase in the speed of an adsorption holding operation while reducing the deviation of the holding position.

According to a configuration described in claim 8, the second holding mechanism has an air opening hole that communicates with an outside from an inside of the object when the object is held. Thus, air can be appropriately sucked in, negative pressure inside the object can be reduced to a target setting value, and air can be sucked (highly vacuumed) in a balanced manner in a short period of time when the opening end of the object is adsorbed and held.

As a result, even if the object is, for example, a can or the like having an opening end that is easily deformed, it becomes possible to prevent the deformation of the opening end and attain an increase in the speed of the adsorption holding operation while reducing the deviation of the holding position.

According to a configuration described in claim 9, it becomes possible to maintain a state in which the object comes in contact with one of or both the contact members of the two holding mechanisms when the object is transferred. Therefore, the influence is reduced, that is a difference in the speed vector, gravity acceleration, air resistance, or the like of the two holding mechanisms caused when the object does not come in contact with both the contact members of the two holding mechanisms, whereby it becomes possible to attain an increase in the speed of a transfer operation without causing the deviation of the holding position.

REFERENCE SIGNS LIST

Figure 1:
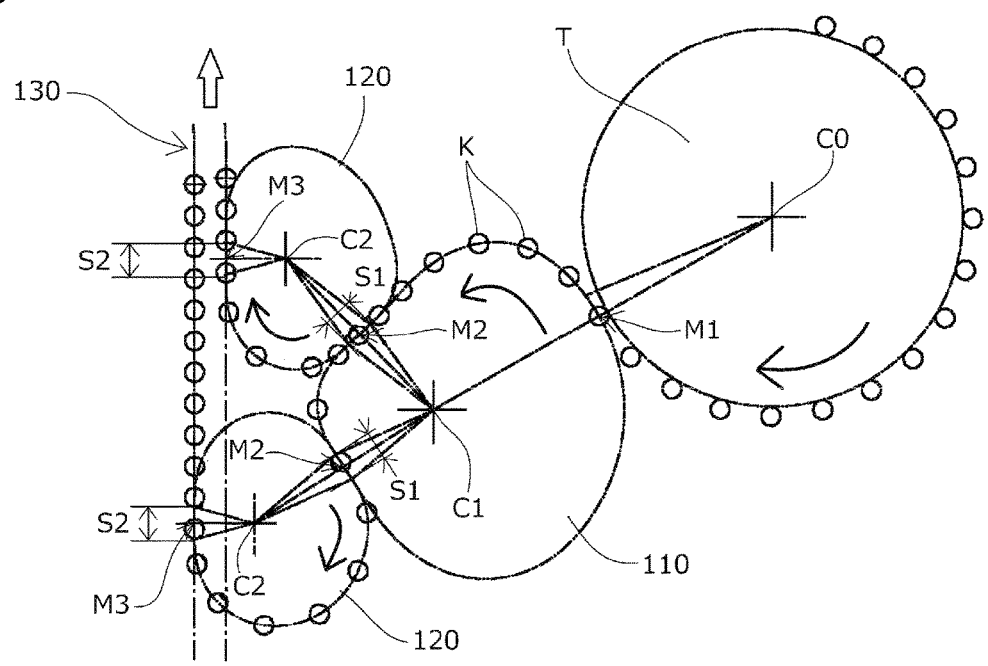
FIG. 1 is a schematic explanatory view of the interval adjustment mechanism of a conveyance device according to an embodiment of the present invention.

100 Conveyance device
110 Conveyance turret
111 Holding unit
112 Cam follower member
113 Cam member
114 Gas circulation hole
120 Carrying-out turret
121 Holding unit
122 Cam follower member
123 Cam member
124 Gas circulation hole
130 Carrying-out conveyor
131 Conveyor belt
132 Lateral corner part
134 Gas circulation hole
140 Oven carrying-in device
200 First holding mechanism (Adsorption holding mechanism)
210 Negative pressure introduction member
211 Slide guiding part
212 Protrusion restriction step part
220 Contact member
221 Sliding sleeve
222 Engagement step part
223 Fitting restriction end
230 Coil spring (Urging member)
240 Guide member
241 Deformation prevention part
242 Fitting restriction surface
300 Second holding mechanism (Adsorption holding mechanism)
310 Negative pressure introduction member
311 Slide guiding part
312 Protrusion restriction step part
313 Air opening hole
320 Contact member
321 Sliding cylindrical part
322 Engagement step part
323 Fitting restriction end
324 Air opening hole
330 Coil spring (Urging member)
340 Guide member
342 Fitting restriction surface
343 Air opening hole
K Can (Conveyed object)
T Printing turret
TM Holding mandrel
S Linear movement track region
Transfer position
C Rotation center
D Oven
L1 Facing interval (when both first holding mechanism and second holding mechanism protrude)
L2 Movement enabling distance (of first holding mechanism)

L3 Movement enabling distance (of second holding mechanism)
LM Facing interval (between holding mandrel and first holding mechanism)
LK1 Clearance (between can and first holding mechanism)
LK2 Clearance (between can and second holding mechanism)

DESCRIPTION OF EMBODIMENTS

Figure 2:
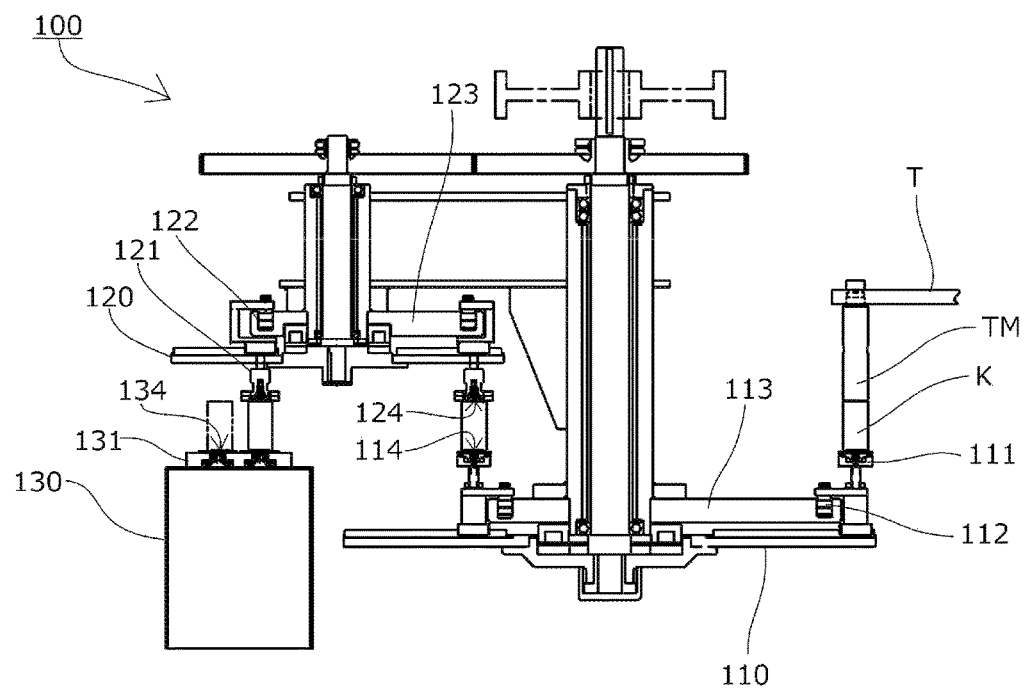
FIG. 2 is an explanatory view of the cross section of the partial arrangement of the conveyance device according to the embodiment of the present invention.
Figure 3:
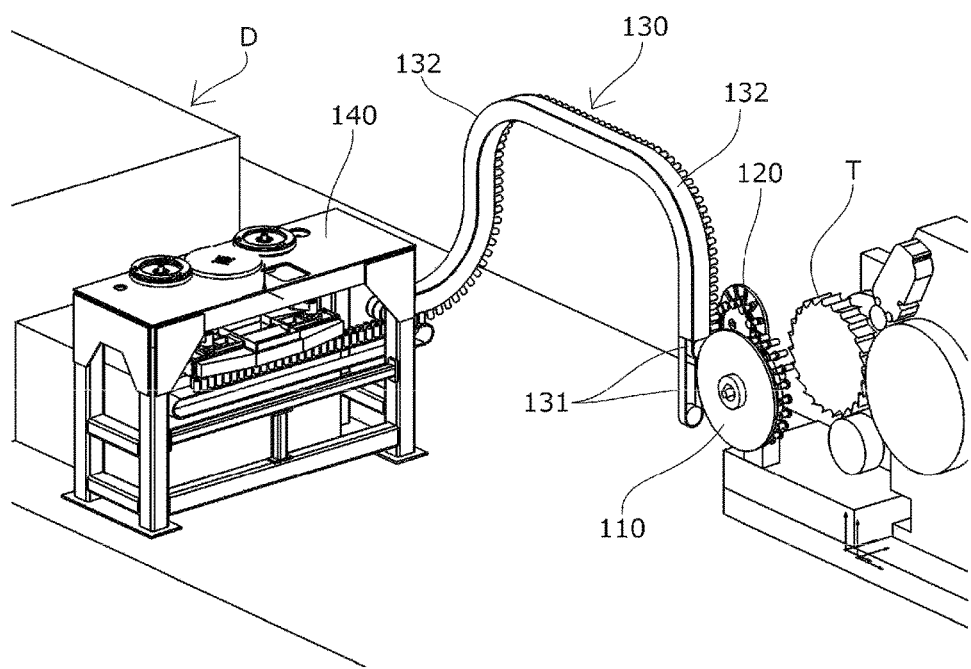
FIG. 3 is an explanatory view of the entire arrangement of the conveyance device according to the embodiment of the present invention.

As shown in FIG. 1 to FIG. 3, a conveyance device 100 according to an embodiment of the present invention conveys cans K representing conveyed objects from a printing process to a baking process, and is configured such that a conveyance turret 110 receives the cans K representing conveyed objects from a printing turret T and a carrying-out conveyor 130 holds the cans K representing conveyed objects in two rows and carries out the same to an oven D.

As turrets, the conveyance turret 110 that receives the cans K supplied from the printing turret T and a carrying-out turret 120 that transfers the cans K to the carrying-out conveyor 130 are provided.

Two carrying-out turrets 120 are provided so as to correspond to the two rows of the carrying-out conveyor 130, respectively.

The conveyance turret 110 and the two carrying-out turrets 120 have a plurality of holding units 111 and 121, respectively, each of which individually adsorbs and holds the can K.

The holding units 111 and 121 are arranged so as to be movable in a radial direction on the conveyance turret 110 and the two carrying-out turrets 120, respectively, and configured to change the radial positions of the cans K held by an interval adjustment mechanism according to their rotation angles.

The interval adjustment mechanism is constituted by cam members 113 and 123 fixedly provided at the conveyance turret 110 and the two carrying-out turrets 120, respectively, and cam follower members 112 and 122 provided at the holding units 111 and 121, respectively, so as to engage the cam members 113 and 123.

In addition, the holding surfaces of the holding units 111 and 121 for holding the cans K are provided with gas circulation holes 114 and 124, respectively, and are configured to individually hold the cans K by negative pressure and release the cans K by positive pressure supplied via the gas circulation holes 114 and 124.

Note that each of the negative pressure and the positive pressure supplied via the gas circulation holes 114 and 124 is configured to be instantaneously operable by known means not shown at a timing at which the cans K are held and transferred in synchronization with the rotations of the conveyance turret 110 and the two carrying-out turrets 120.

As shown in FIG. 1, a transfer position M1 at which the cans K are to be transferred from holding mandrels TM holding the cans of the printing turret T to the conveyance turret 110 lies on a straight line connecting respective rotation centers C0 and C1 to each other, and transfer positions M2 at which the cans K are to be transferred from the conveyance turret 110 to the two carrying-out turrets 120 lies on straight lines connecting respective rotation centers C1 and C2 to each other.

In addition, transfer positions M3 at which the cans K are to be transferred from the two carrying-out turrets 120 to the carrying-out conveyor 130 lies on straight lines extending from the rotation centers C2 of the carrying-out turrets 120 so as to be perpendicular to the conveyance direction of the carrying-out conveyor 130.

The movement tracks of the holding units 111 and 121 are configured such that linear movement track regions 31 orthogonal at intermediate points on straight lines connecting the rotation centers C1 and C2 to each other are formed in the vicinity of the transfer positions M2 at which the cans K are to be transferred from the conveyance turret 110 to the two carrying-out turrets 120.

In addition, the movement tracks of the holding units 121 are configured such that linear movement track regions S2 extending in the conveyance direction of the carrying-out conveyor 130 are formed in the vicinity of the transfer positions M3 at which the cans K are to be transferred from the carrying-out turrets 120 to the carrying-out conveyor 130.

The carrying-out conveyor 130 has the two rows of conveyor belts 131 to which the cans K are to be transferred from the two carrying-out turrets 120, and is configured to convey, as shown in FIG. 3, the cans K in the two rows to an oven carrying-in device 140 that transfers the cans K to the oven D.

Figure 4:
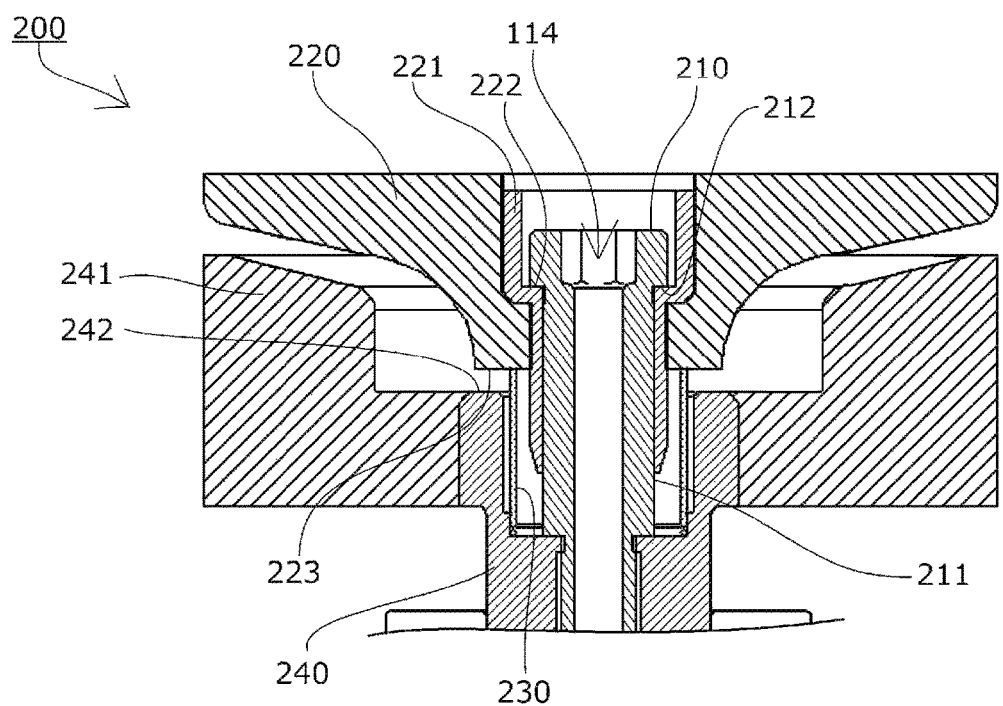
FIG. 4 is a cross-sectional view of the holding unit of a conveyance turret before a can is adsorbed.
Figure 5:
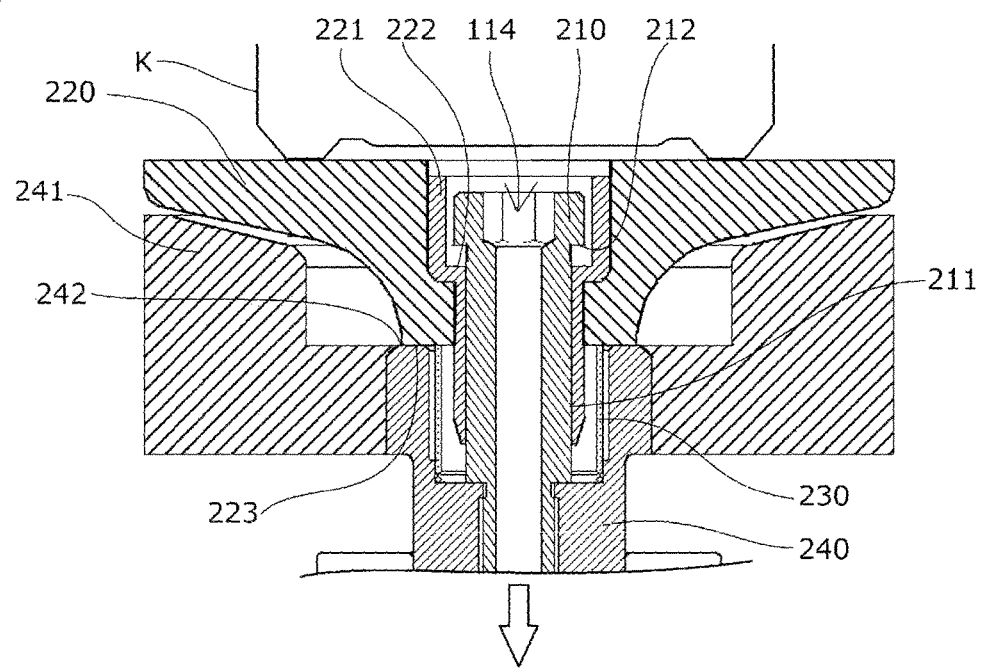
FIG. 5 is a cross-sectional view of the holding unit of the conveyance turret when the can is adsorbed.

The holding units 111 of the conveyance turret 110 use a first holding mechanism 200 as shown in FIG. 4 and FIG. 5.

The first holding mechanism 200 is provided with a negative pressure introduction member 210 opened on its holding surface side via the gas circulation hole 114, a contact member 220 movable with respect to the negative pressure introduction member 210, a coil spring 230 serving as an urging member that urges the contact member 220 in a holding surface direction with respect to the negative pressure introduction member 210, and a guide member 240 that restricts a movement range in the sucking direction of the contact member 220.

The negative pressure introduction member 210 has a slide guiding part 211 onto which a sliding sleeve 221 provided at the contact member 220 is fitted so as to be capable of advancing and retreating. A protrusion restriction step part 212 is provided on the tip end side of the slide guiding part 211, and the guide member 240 is fixed to the rear end side of the slide guiding part 211.

The contact member 220 is configured to be capable of advancing and retreating along the slide guiding part 211 together with the sliding sleeve 221, and urged in a protrusion direction by the coil spring 230 serving as an urging member provided between the contact member 220 and the guide member 240.

On the tip end side of the sliding sleeve 221, an engagement step part 222 is provided that comes in contact with the protrusion restriction step part 212 on the protrusion side of the negative pressure introduction member 210. When the engagement step part 222 comes in contact with the protrusion restriction step part 212, a movement range on the protrusion side of the contact member 220 is restricted.

On the fitting side of the contact member 220, a fitting restriction end 223 is formed. When the fitting restriction end 223 comes in contact with a fitting restriction surface 242 of the guide member 240, a movement range on the fitting side of the contact member 220 is restricted.

In addition, on the outer periphery side of the guide member 240, a deformation prevention part 241 is provided that prevents the deformation of the outer edge part of the contact member 220 when the contact member 220 is pressed.

Note that the deformation prevention part 241 of the first holding mechanism 200 may be provided where necessary or may be eliminated.

According to the first holding mechanism 200, in a state in which the can is not adsorbed and held, air is only sucked in from the opening side of the negative pressure introduction member 210 even when negative pressure is introduced via the gas circulation hole 114, and the contact member 220 is urged in the protrusion direction by the coil spring 230 to be positioned on the protrusion side as shown in FIG. 4.

When the can bottom (bottom part) of the can K comes in contact with the contact member 220 in this state, the space between the contact member 220 and the can bottom of the can K is closed, which results in an increase in the negative pressure introduced via the gas circulation hole 114. As shown in FIG. 5, the contact member 220 is caused by the negative pressure to move to the fitting side against the urging force of the coil spring 230 in a state in which the can K is adsorbed and held.

Thus, an impact at a moment at which the contact member 220 comes in contact with the can bottom of the can K can be lessened by the movement of the contact member 220 against the urging force.

Figure 6:
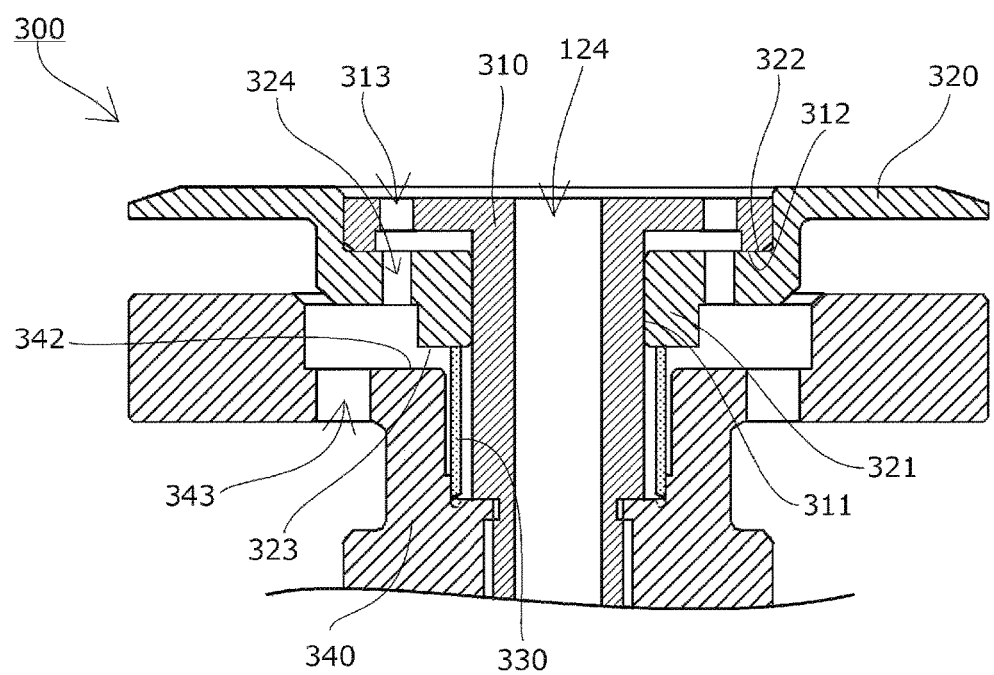
FIG. 6 is a cross-sectional view of the holding unit of a carrying-out turret before the can is adsorbed.
Figure 7:
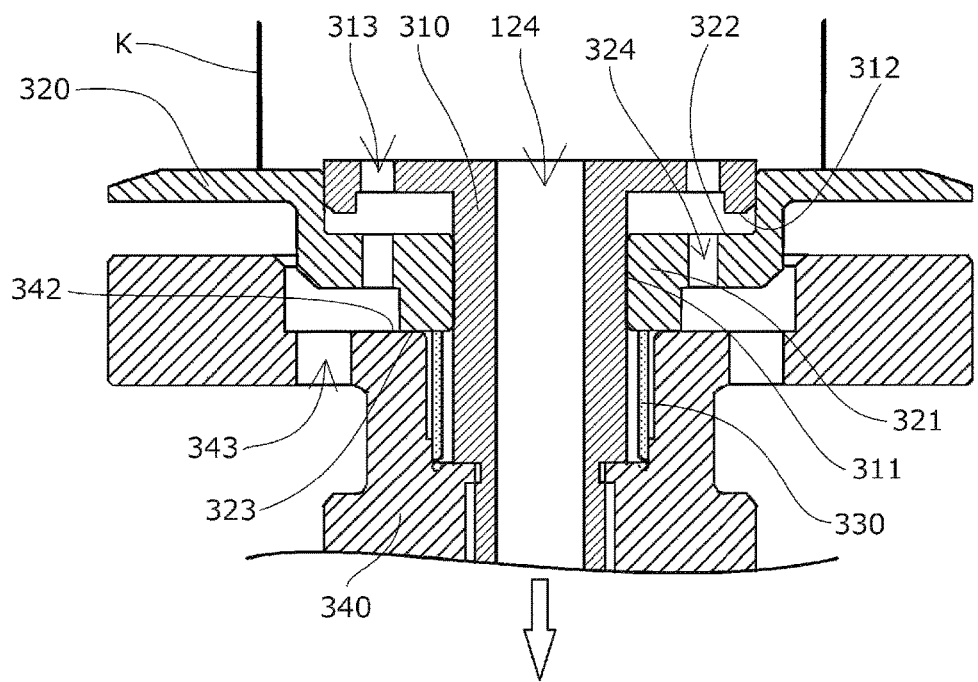
FIG. 7 is a cross-sectional view of the holding unit of the carrying-out turret when the can is adsorbed.

The holding units 121 of the carrying-out turrets 120 use a second holding mechanism 300 as shown in FIG. 6 and FIG. 7.

Like the first holding mechanism 200, the second holding mechanism 300 is provided with a negative pressure introduction member 310 opened on its holding surface side via the gas circulation hole 124, a contact member 320 movable with respect to the negative pressure introduction member 310, a coil spring 330 serving as an urging member that urges the contact member 320 in a holding surface direction with respect to the negative pressure introduction member 310, and a guide member 340 that restricts a movement range in the sucking direction of the contact member 320.

The negative pressure introduction member 310 has a slide guiding part 311 onto which a sliding cylindrical part 321 of the contact member 320 is fitted so as to be capable of advancing and retreating. A protrusion restriction step part 312 is provided on the rear side of the negative pressure introduction member 310, and the guide member 340 is fixed to the rear end side of the slide guiding part 311.

The contact member 320 is urged in a protrusion direction by the coil spring 330 serving as an urging member provided between the contact member 320 and the guide member 340.

The contact member 320 is provided with an engagement step part 322 that comes in contact with the protrusion restriction step part 312 of the negative pressure introduction member 310. When the engagement step part 322 comes in contact with the protrusion restriction step part 312, a movement range on the protrusion side of the contact member 320 is restricted.

On the fitting side of the contact member 320, a fitting restriction end 323 is formed. When the fitting restriction end 323 comes in contact with a fitting restriction surface 342 of the guide member 340, a movement range on the fitting side of the contact member 320 is restricted.

The negative pressure introduction member 310, the contact member 320, and the guide member 340 are provided with air opening holes 313, 324, and 343, respectively, each having a diameter smaller than that of the gas circulation hole 124 of the negative pressure introduction member 310, and communicate with outer space via the holes.

In addition, the negative pressure introduction member 310 is formed to be smaller than the opening end (trim part) of the can K representing an object.

According to the second holding mechanism 300, in a state in which the opening end of the can K is not adsorbed and held, air is only sucked in from the opening side of the negative pressure introduction member 310 even when negative pressure is introduced via the gas circulation hole 124, and the contact member 320 is urged in the protrusion direction by the coil spring 330 to be positioned on the protrusion side as shown in FIG. 6.

When the opening end of the can K comes in contact with the contact member 320 in this state, the space between the contact member 320 and the opening end of the can K is closed, which results in an increase in the negative pressure introduced via the gas circulation hole 124. As shown in FIG. 7, the contact member 320 is caused by the negative pressure to move to the fitting side against the urging force of the coil spring 330 in a state in which the opening end of the can K is adsorbed and held.

Thus, an impact at a moment at which the contact member 320 comes in contact with the opening end of the can K can be lessened by the movement of the contact member 320 against the urging force.

In addition, the negative pressure introduction member 310, the contact member 320, and the guide member 340 are provided with the air opening holes 313, 324, and 343, respectively, to make air appropriately sucked in, whereby negative pressure inside the can K can be reduced to a target setting value, air can be sucked (highly vacuumed) in a balanced manner in a short period of time when the opening end of the can K is adsorbed and held, and the deformation of the opening end of the can K can be prevented even when the opening end of the can K having less intensity is adsorbed.

Note that the urging members of the first holding mechanism 200 and the second holding mechanism 300 described above are not limited to the coil springs 230 and 330, and any other urging members may be used so long as they are elastic bodies.

A description will be given of the conveyance operation of the cans K in the conveyance device 100 configured as described above.

As shown in FIG. 1 and FIG. 2, the cans K are held by the holding mandrels TM arranged at a prescribed interval on the printing turret T of a prior process, and caused to continuously move toward the transfer position M1 of the conveyance turret 110 by the rotation of the printing turret T.

The conveyance turret 110 continuously rotates in a synchronous manner such that the holding surfaces of the holding units 111 (the first holding mechanisms 200) and the cans K held by the holding mandrels TM face each other at the transfer position M1.

At this time, the transfer position M1 is set at an intermediate point lying on a straight line connecting the rotation centers C0 and C1 of the conveyance turret 110 and the printing turret T to each other. Therefore, at the transfer position M1, the first holding mechanisms 200 used in the holding units 111 and the holding mandrels TM move at the same speed in the same direction and also have the same interval therebetween.

Then, air is sucked in via the gas circulation holes 114 of the holding surfaces of the holding units 111 just before the transfer position M1, and the holding mandrels TM release the holding of the cans K at the transfer position M1. In this manner, the can bottoms of the cans K are instantaneously sucked and held by the holding surfaces of the holding units 111 at the transfer position M1.

The holding units 111 having sucked and held the can bottoms of the cans K by negative pressure are caused to move to the side of the rotation center C1 along the shape of the cam member 113 by the rotation of the conveyance turret 110, and then directed to the transfer positions M2, at which the cans K are to be transferred to the carrying-out turrets 120, as the movement speed of the holding units 111 decreases and the interval between the adjacent holding units 111 narrows.

Among the two carrying-out turrets 120 provided, the holding units 121 (the second holding mechanisms 300) of the carrying-out turret 120 on an upstream side face the alternately-arranged holding units 111 of the conveyance turret 110 and receive half of the cans K at the transfer position M2 on the upstream side, and the holding units 121 (the second holding mechanisms 300) of the carrying-out turret 120 on the downstream side face the rest alternately-arranged holding units 111 (the first holding mechanisms 200) of the conveyance turret 110 and receive the rest half of the cans K at the transfer position M2 on the downstream side.

Air is sucked in via the gas circulation holes 124 of the holding surfaces of the holding units 121 of the carrying-out turrets 120 just before the transfer positions M2, and positive pressure is given to the gas circulation holes 114 of the holding surfaces of the holding units 111 of the conveyance turret 110 at the transfer positions M2 to release the holding of the can bottoms of the cans K. In this manner, the opening ends of the cans K are instantaneously sucked and held by the holding surfaces of the holding units 121 at the transfer positions M2.

Figure 8:
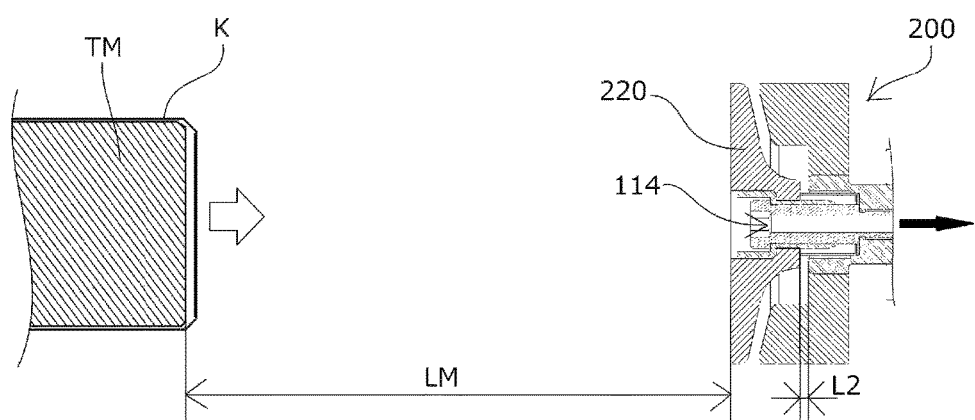
FIG. 8 is an explanatory view of a state immediately before the can is transferred from a holding mandrel to a first holding mechanism.
Figure 9:
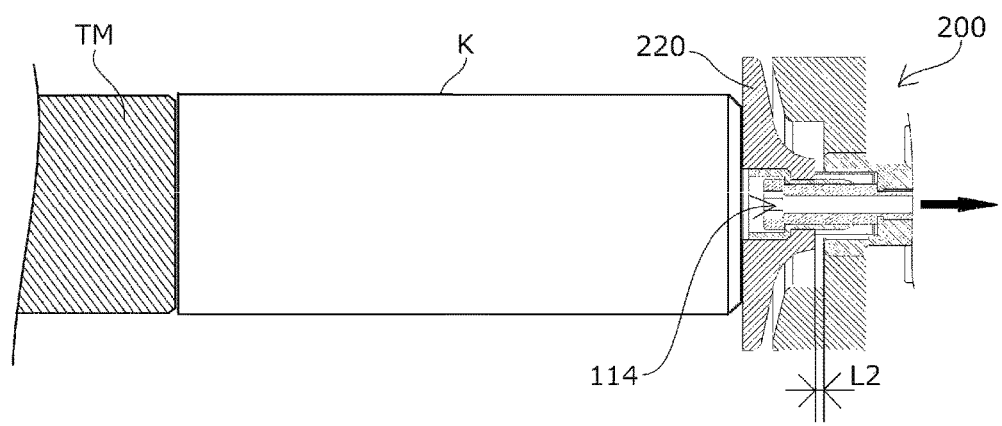
FIG. 9 is an explanatory view of a halfway state in which the can is transferred from the holding mandrel to the first holding mechanism.
Figure 10:
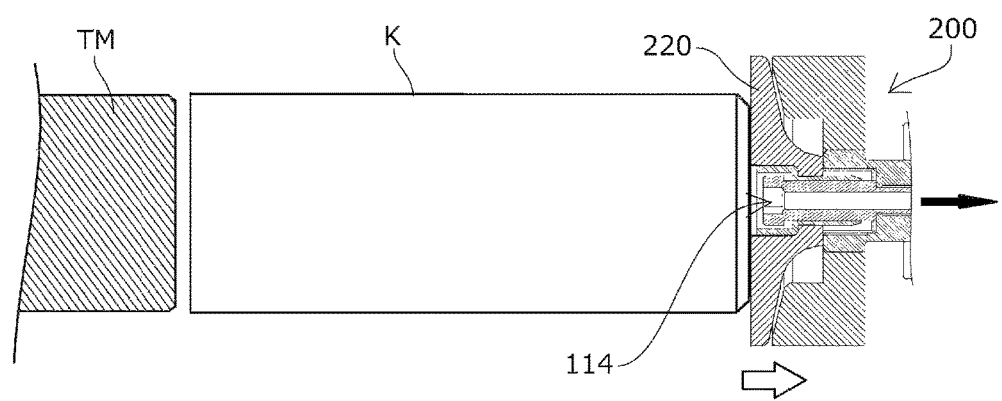
FIG. 10 is an explanatory view of a state in which the transfer of the can is completed from the holding mandrel to the first holding mechanism.
Figure 11:
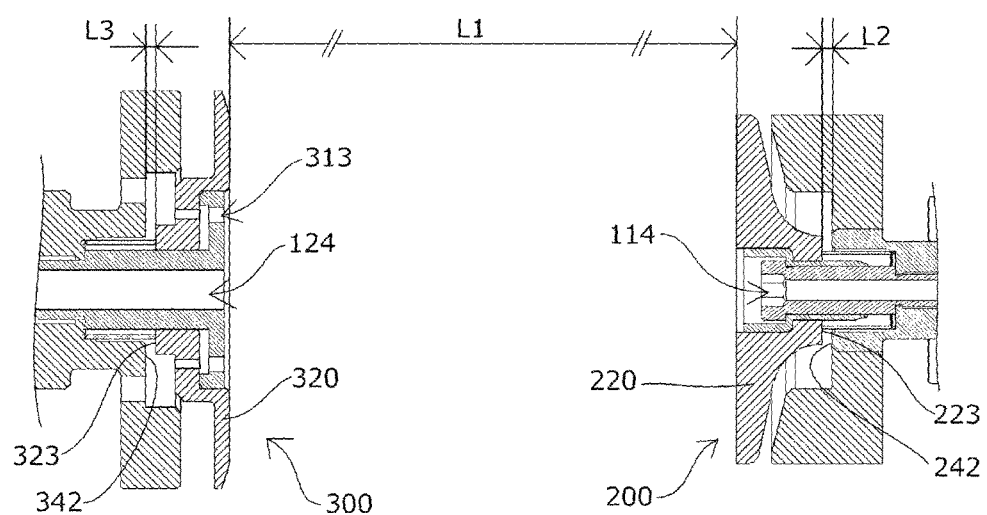
FIG. 11 is a view of the relative dimension between the first holding mechanism and a second holding mechanism.

As shown in FIG. 8 to FIG. 10, a facing interval LM is set to be nearly the same as an entire length KL of the cans K, which is an interval between the tip ends of the holding mandrels TM and the holding surfaces of the first holding mechanisms 200 in a state in which the contact members 220 protrude.

As shown in FIG. 8, the cans K are held by the holding mandrels TM with their can bottoms directed to the side of the first holding mechanisms 200, air is sucked in via the gas circulation holes 114 of the holding surfaces of the first holding mechanisms 200 just before the transfer position M1, and the holding mandrels TM instantaneously discharge the cans K to the side of the first holding mechanisms 200 at the transfer position M1 with known means.

As shown in FIG. 9, since the facing interval LM is set to be nearly the same as the entire length KL of the cans K, the discharged cans K are released from the holding mandrels TM when the can bottoms come in contact with the contact members 220 of the first holding mechanisms 200.

After coming in contact with the contact members 220 of the first holding mechanisms 200, the can bottoms of the cans K are sucked and held by the holding units 111 using the first holding mechanism 200 in a state in which the contact members 220 retreat by a movement enabling distance L2 as shown in FIG. 10.

The holding units 111 having sucked and held the can bottoms of the cans K by negative pressure are caused to move to the side of the rotation center C1 along the shape of the cam member 113 by the rotation of the conveyance turret 110, and then directed to the transfer positions M2, at which the cans K are to be transferred to the carrying-out turrets 120, as the movement speed of the holding units 111 decreases and the interval between the adjacent holding units 111 narrows.

Among the two carrying-out turrets 120 provided, the holding units 121 of the carrying-out turret 120 on the upstream side face the alternately-arranged holding units 111 of the conveyance turret 110 and receive half of the cans K at the transfer position M2 on the upstream side, and the holding units 121 of the carrying-out turret 120 on the downstream side face the rest alternately-arranged holding units 111 of the conveyance turret 110 and receive the rest half of the cans K at the transfer position M2 on the downstream side.

The holding units 121 of the carrying-out turrets 120 use the second holding mechanism 300 described above. At the transfer positions M2, an embodiment of a transfer method and a transfer system according to the present invention is constituted by the first holding mechanism 200 used in the holding units 111 of the conveyance turret 110 and the second holding mechanism 300 used in the holding units 121 of the carrying-out turrets 120.

Both the contact members 220 of the first holding mechanisms 200 and the contact members 320 of the second holding mechanisms 300 face each other at a facing interval L1 in their protruding states, and the facing interval L1 is set to be smaller than or the same as the entire length KL of the transferred cans K.

In addition, each of an interval L1+L2 and an interval L1+L3 is set to be greater than the entire length KL of the transferred cans K. An interval L1+L2 means an interval obtained when only the contact members 220 of the first holding mechanisms 200 retreat by the movement enabling distance L2, and an interval L1+L3 means an interval obtained when only the contact members 320 of the second holding mechanisms 300 retreat by a movement enabling distance L3.

Figure 12:
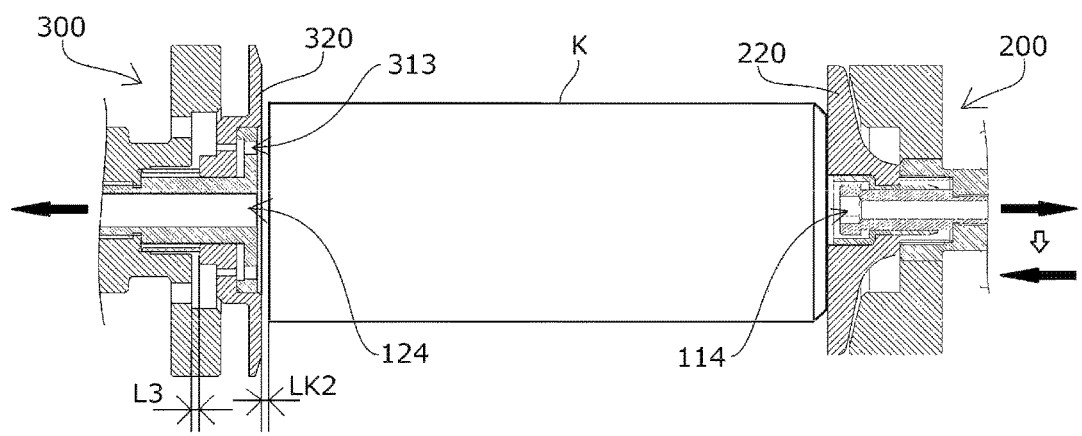
FIG. 12 is an explanatory view of a state immediately before the can is transferred from the first holding mechanism to the second holding mechanism.

As shown in FIG. 12, the cans K are sucked and held by the first holding mechanisms 200 with their opening ends (trim parts) directed to the sides of the second holding mechanisms 300, and the suction of air starts just before the transfer positions M2 via the gas circulation holes 124 of the holding surfaces of the second holding mechanisms 300.

At the transfer positions M2, clearances LK2 are created between the opening ends of the cans K and the holding surfaces of the second holding mechanisms 300, and positive pressure is given to the gas circulation holes 114 of the holding surfaces of the first holding mechanisms 200 to discharge the cans K to the sides of the holding surfaces of the second holding mechanisms 300.

Figure 13:
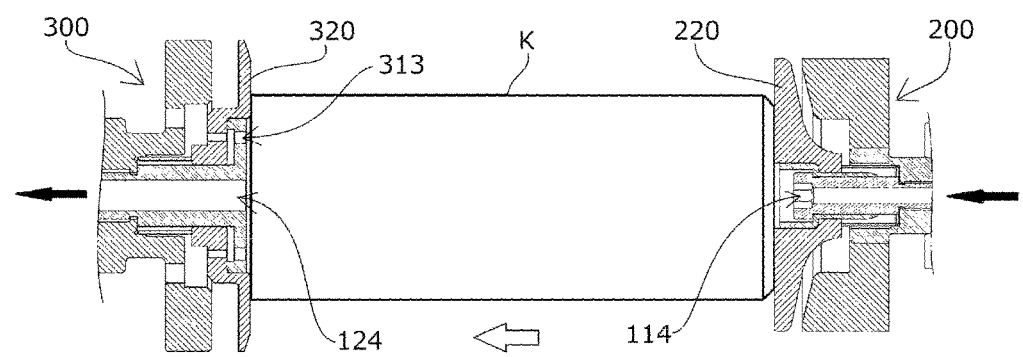
FIG. 13 is an explanatory view of a halfway state in which the can is transferred from the first holding mechanism to the second holding mechanism.

At this time, the contact members 220 of the first holding mechanisms 200 are also urged by the urging members 230 to protrude together with the cans K. Therefore, as shown in FIG. 13, the can bottoms of the cans K continue to come in contact with the contact members 220 of the first holding mechanisms 200 until the opening ends of the cans K come in contact with the contact members 320 of the second holding mechanisms 300, whereby it becomes possible to reduce the influence of a difference in speed vector, gravity acceleration, air resistance, or the like of the two holding mechanisms and attain an increase in the speed of a transfer operation without causing the deviation of a holding position.

Figure 14:
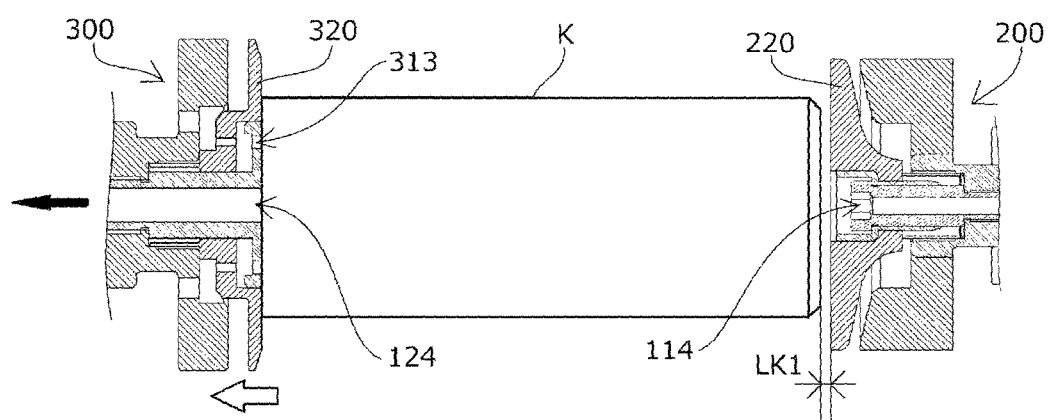
FIG. 14 is an explanatory view of a state in which the transfer of the can is completed from the first holding mechanism to the second holding mechanism.

After coming in contact with the contact members 320 of the second holding mechanisms 300, the opening ends of the cans K are sucked and held by the holding units 121 using the second holding mechanism 300 in a state in which the contact members 320 retreat by the movement enabling distance L3 as shown in FIG. 14, and clearances LK1 are created between the can bottoms of the cans K and the holding surfaces of the first holding mechanisms 200 to complete the transfer.

By the transfer, each of the carrying-out turrets 120 receives the alternately-arranged cans K at the transfer position M2.

Therefore, the narrowed interval between the cans K temporarily doubles. However, the holding units 121 are caused to move to the sides of the rotation centers C2 along the shape of the cam member 123 by the rotations of the carrying-out turrets 120, and then directed to the transfer positions M3, at which the cans K are to be transferred to the carrying-out conveyor 130, as the movement speed of the holding units 121 decreases and the interval between the adjacent holding units 121 narrows again.

The carrying-out conveyor 130 is composed of, for example, conveyor belts 131 having a multiplicity of gas circulation holes 134 on their holding surfaces and capable of being sucked from its opposite side, and configured to be capable of holding the cans K in the two rows. Further, the cans K transferred from the holding units 121 of the carrying-out turret 120 on the upstream side are to be transferred to one of the rows (a right row shown in FIG. 1), and the cans K transferred from the holding units 121 of the carrying-out turret 120 on the downstream side are to be transferred to the other of the rows (a left row shown in FIG. 1).

The can bottoms of the cans K are sucked via the gas circulation holes 134 of the holding surfaces of the conveyor belts 131 of the carrying-out conveyor 130 just before the transfer positions M3, and positive pressure is given to the gas circulation holes 124 of the holding surfaces of the holding units 121 of the carrying-out turrets 120 at the transfer positions M3 to release the holding of the opening ends of the cans K, whereby the can bottoms of the cans K are instantaneously sucked and held by the holding surfaces of the conveyor belts 131 at the transfer positions M3.

By such a series of operations from the printing turret T to the carrying-out conveyor 130, the cans K are arranged in the two rows while the interval between the cans K narrows and the movement speed decreases.

For example, when it is assumed that the ratio of the radial position of the transfer position M1 to those of the transfer positions M2 in the conveyance turret 110 is 1 to 2 and that the ratio of the radial positions of the transfer positions M2 to those of the transfer positions M3 in the two carrying-out turrets 120 is 1 to 2, the movement speed of the cans K on the carrying-out conveyor 130 becomes ¼ of that of the cans K at the transfer position M1 of the printing turret T. Similarly, the interval between the cans K on the carrying-out conveyor 130 becomes ½ of that between the cans K at the transfer position M1 of the printing turret T. In addition, the cans K are arranged in the two rows on the carrying-out conveyor 130.

The cans K having been transferred from the carrying-out turrets 120 to the carrying-out conveyor 130 are transferred to the oven carrying-in device 140 that transfers the cans K to the oven D that performs the baking process.

The oven D bakes a multiplicity of the cans K arranged side by side in one row in a width direction while conveying the same in a direction orthogonal to the alignment of the row. The cans K are carried in the oven carrying-in device 140 by the carrying-out conveyor 130, and then the oven carrying-in device 140 collectively transfers the two rows to the oven D.

In the oven D, it is desirable that the pitch between the rows of the cans K and the pitch between the cans K of the respective rows are almost the same and the cans K deviate from each other by half a pitch between the adjacent rows to be arranged in a staggered manner. Therefore, the conveyance path lengths of the two conveyor belts 131 of the carrying-out conveyor 130 are configured to be different from each other such that the cans K of the two rows reach the oven carrying-in device 140 in a state of deviating from each other by just half a pitch (such that the cans K can be discharged from their terminal ends).

In the embodiment, the carrying-out conveyor 130 has lateral corner parts 132 at two places as shown in FIG. 3, and the radii of the curves of the two conveyor belts 131 at the lateral corner parts 132 are separately set, whereby the difference between the respective conveyance path lengths can be freely changed.

Therefore, regardless of how the cans K of the two rows are arranged on the two conveyor belts 131 when the cans K are transferred from the carrying-out turrets 120, the radii of the curves of the two conveyor belts 131 at the lateral corner parts 132 are appropriately set, whereby the carrying-out conveyor 130 can be designed such that the cans K of the two rows reliably reach the oven carrying-in device 140 in a state of deviating from each other by just half a pitch.

Note that according to the entire arrangement and path of the carrying-out conveyor 130, a part that makes a difference in the conveyance path lengths of the two conveyor belts 131 may be provided at any place or a part at which the two conveyor belts 131 are caused to have different conveyance speeds may be provided on the conveyance path of the carrying-out conveyor 130 to adjust the positional relationship between the cans K of the respective rows.

In the embodiment, the interval adjustment mechanism under the two stages of the conveyance turret 110 and the carrying-out turrets 120 achieves both the arrangement of the cans in the two rows and the reduction in the interval between the cans that are hardly achieved under one stage, and eliminates a difference in the speed between the transfer positions. However, when further multiple stages are used to make multiple interval adjustment mechanisms, it becomes also possible to arrange the cans in a plurality of rows, i.e., three or more rows, and minimize the interval between the cans.

In addition, under multiple stages, a turret that does not have an interval adjustment mechanism may be provided in any of the stages.

INDUSTRIAL APPLICABILITY

The conveyance device of the present invention may be directed to any purpose and any conveyed object so long as conveyed objects continuously supplied from a previous process at a prescribed interval are conveyed to a subsequent process while changing their intervals and speeds, and is applicable to the conveyance of various conveyed objects.

In addition, the configuration for holding conveyed objects and the transfer method in each of the conveyance turret, the carrying-out turrets, and the carrying-out conveyor may be appropriately selected according to the materials and the shapes of the conveyed objects.

For example, when conveyed objects are magnetic bodies such as steel cans, a holding mechanism using a magnetic force may be used. When conveyed objects are those that are hardly deformed, a gripping mechanism or the like may be used.

In addition, the holding mechanism and the transfer configuration of the holding mechanism described above may be directed to any purpose and any conveyed object so long as conveyed objects are transferred between different conveyance means, and are applicable to the adsorption conveyance and the transfer of various conveyed objects.

The invention claimed is:

1. A conveyance device having: a conveyance turret that holds and conveys conveyed objects that are continuously supplied; a carrying-out turret that holds the conveyed objects and transfers the same to a carrying-out conveyor; and the carrying-out conveyor that holds the conveyed objects and continuously carries out the same, wherein the carrying-out conveyor is configured to hold the conveyed objects in a plurality of rows and carry out the same, the carrying-out turret is provided in plurality so as to correspond to the plurality of rows of the carrying-out conveyor, the conveyance turret and the carrying-out turret have an interval adjustment mechanism that changes radial positions of the held conveyed objects, according to rotation angles thereof, and the interval adjustment mechanism is configured to perform based on the rotation angles of the held conveyed objects.

2. The conveyance device according to claim 1, wherein the conveyance turret and the carrying-out turret have a plurality of holding units that individually holds the conveyed objects, and the interval adjustment mechanism has cam members fixedly provided in parallel with the turrets and cam follower members provided at the holding units so as to engage the cam members.

3. The conveyance device according to claim 2, wherein the holding units each have a gas circulation hole at a holding surface thereof for holding the conveyed objects, and the holding units are configured to individually hold the conveyed objects by negative pressure and release the conveyed objects by positive pressure.

4. The conveyance device according to claim 2, wherein the holding units draw a linear movement track before and after a transfer position at which the conveyed objects are transferred.

5. The conveyance device according to claim 1, wherein the carrying-out conveyor is configured to be capable of discharging the conveyed objects of the adjacent rows from terminal ends thereof, with the adjacent rows being deviated from each other by half a pitch.

6. The conveyance device according to claim 1, wherein the carrying-out conveyor has different conveyance path lengths for the plurality of rows.

7. The conveyance device according to claim 1, wherein one of the conveyance turret and the carrying-out turret has a first holding mechanism that adsorbs a bottom part of an object and the other of the conveyance turret and the carrying-out turret has a second holding mechanism that adsorbs an opening end of the object, both the first holding mechanism and the second holding mechanism include a negative pressure introduction member, a contact member movable with respect to the negative pressure introduction member, an urging member that urges the contact member in a holding surface direction with respect to the negative pressure introduction member, and a guide member that restricts a movement range in a sucking direction of the contact member, and the negative pressure introduction member has an opening on a side of the holding surface via the gas circulation hole.

8. The conveyance device according to claim 7, wherein the second holding mechanism has an air opening hole that communicates with an outside from an inside of the object when the object is held.

9. The conveyance device according to claim 7, wherein the first holding mechanism and the second holding mechanism facing each other at a facing position are arranged such that a facing interval between the holding surfaces of the respective contact members becomes shorter than or same as a length of the object in a state in which both the contact members are protruded and becomes longer than the length of the object in a state in which both the contact members are moved in the sucking direction.

* * * * *